(12) United States Patent
Higashino

(10) Patent No.: US 6,243,537 B1
(45) Date of Patent: Jun. 5, 2001

(54) DISTANCE MEASURING APPARATUS

(75) Inventor: Fuminobu Higashino, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/417,994

(22) Filed: Oct. 13, 1999

(30) Foreign Application Priority Data

| Oct. 15, 1998 | (JP) | 10-293428 |
| Oct. 15, 1998 | (JP) | 10-293429 |
| Jun. 10, 1999 | (JP) | 11-163367 |

(51) Int. Cl.[7] .................................................. G03B 13/36
(52) U.S. Cl. ............................................. 396/98; 396/106
(58) Field of Search .......................... 396/98, 104, 106; 356/3.07, 3.06, 3.03, 3.01

(56) References Cited

U.S. PATENT DOCUMENTS

| 4,490,036 | 12/1984 | Anagnostopoulos | 396/106 |
| 4,522,492 | 6/1985 | Masunaga | 396/106 |
| 4,678,323 | 7/1987 | Sato et al. | 396/106 |
| 4,681,432 | 7/1987 | Kawabata et al. | 396/106 |
| 5,138,358 | 8/1992 | Aoyama et al. | 396/106 |
| 5,721,970 | * 2/1998 | Ikeda | 396/104 X |
| 5,870,178 | 2/1999 | Egawa et al. | 396/106 |

FOREIGN PATENT DOCUMENTS

| 0768543 | 4/1997 | (EP) . |
| 2125650 | 3/1984 | (GB) . |
| 2125651 | 3/1984 | (GB) . |
| 10243281 | 9/1998 | (JP) . |

* cited by examiner

*Primary Examiner*—W. B. Perkey
(74) *Attorney, Agent, or Firm*—Greenblum & Bernstein P.L.C.

(57) ABSTRACT

Disclosed is a distance measuring apparatus for measuring the distance to an object. The apparatus has a line of charge couple device (CCD) elements operated in combination with a light emitting element emitting visible light for active sensing. First data (DATA1) is obtained from the sensor while the light emitting element is emitting light and second data (DATA2) is obtained from the sensor while the light emitting element is not emitting light. Corresponding CCD elements of each data are compared and used to provide to corrected the second data (DATA2'). The difference between the corrected second data and the first data (DATA0) enables the detection of the spectral center of a received image of the object.

9 Claims, 15 Drawing Sheets

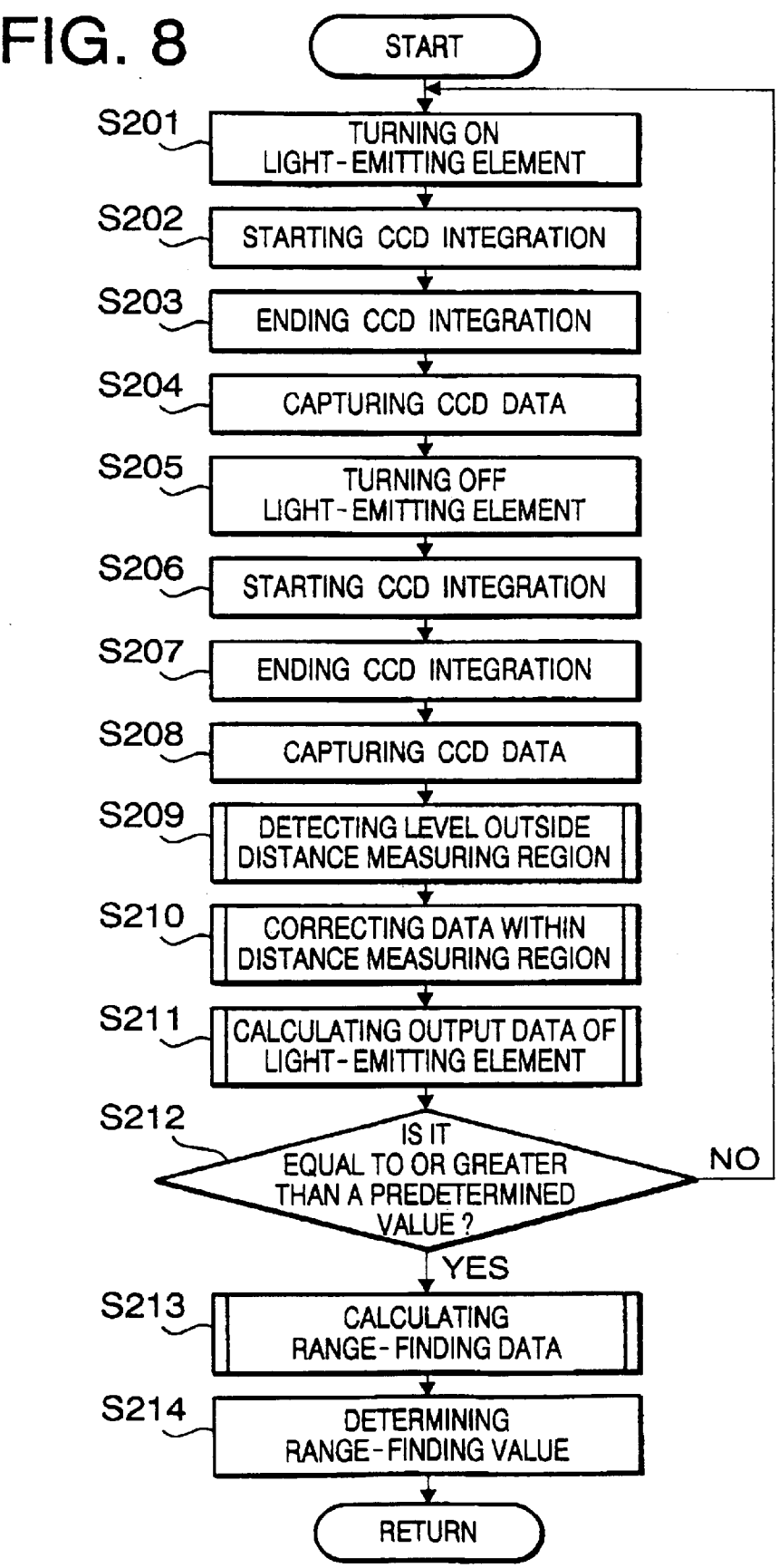

OUTPUTS AT THE TIME OF EMISSION AND NON-EMISSION OF LIGHT

NA : NON-USABLE AREA    UA : USABLE AREA

OPERATING OUTPUT LEVEL OUTSIDE DISTANCE MEASURING REGION

CORRECTING DATA WITHIN DISTANCE MEASURING REGION

OUTPUT DATA OF EMITTED LIGHT PROVIDED BY OPERATION

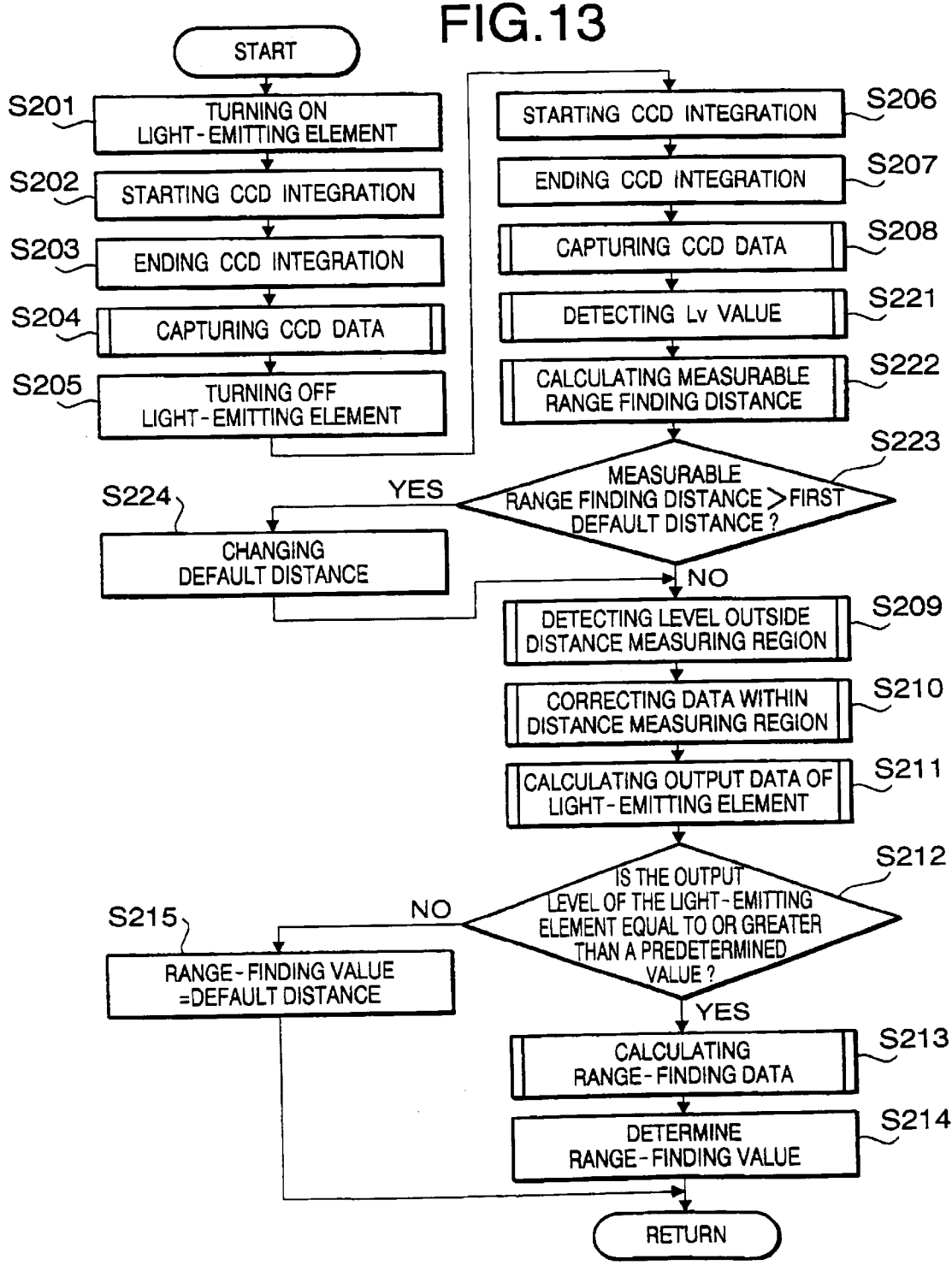

PREDICTED REACHING DISTANCE

DEFAULT DISTANCE CHANGE

DISTANCE MEASURING APPARATUS

BACKGROUND OF THE INVENTION

The present invention relates to a distance measuring apparatus used for cameras, video cameras, and the like for measuring the distance to an object, and more particularly to such an apparatus using an active method of distance measuring which employs CCD sensors as light receiving sensors.

One technique for the measurement of the distance to an object, the passive method, uses two light receiving sensors having the same optical system. These detect the contrast of an object in order to determine the distance in accordance with a shift in position caused by the parallax of the object as projected on each light receiving sensor. The passive method utilizes ambient light. Thus, it is possible to perform accurate distance measurement if the object is bright enough for the light receiving sensor to detect the object. However, the accuracy decreases when the object does not provide sufficient contrast or is dark.

Another technique for the measurement of the distance to an object, the active method, uses light emitted from a light emitting element towards the object, which is then reflected by the object and detected by system of light receiving elements. The position of the spectral center of the light reflected from the object is used to determine the distance by the triangulation method. With the active method, while distance measurement is possible when the object is dark, has no contrast, or has repeated patterns which reflect light, it is difficult to provide highly accurate range finding for an object located at a relatively large distance away due to a decrease in the quantity of light reflected from the object.

With operations using the active method, it has been found to be difficult to clearly distinguish whether the light reflected from the object is derived from ambient light or the light emitted by the light emitting element. Accordingly, it is difficult to detect the spectral center of the reflected light. Thus, the distance is not measurable and hence highly accurate distance measurement is not possible.

In some known distance measuring devices using the active method, a predetermined default distance value is utilized when the brightness of ambient light is greater than a predetermined level and a distance value is not measurable. However, this default distance value is set to a fixed value. Thus, even though the measurable distance may have changed due to variations in the brightness of the ambient light, the fixed default value is still utilized thereby making accurate distance measuring impossible.

Therefore, in known distance measuring apparatus using the active method, a light emitting element emitting infrared light has been used in combination with light receiving elements having a reduced sensitivity to visible light thereby making it possible to distinguish between the light emitted from the light emitting element and the ambient light.

However, it is then necessary to use a light emitting element and light receiving elements that are capable of emitting and receiving infrared light respectively. As a result, general purpose visible light emitting elements or light receiving elements can not be employed, and parts such as filters for separating infrared light from visible light are required. This makes it difficult to reduce the cost of the distance measuring apparatus using the active method.

If instead visible light is used for distance measuring using the active method, then the light receiving elements must determine the difference between the quantities of the light received in the case of light being reflected by an object with and without light emission by the light emitting element in order for the spectral center to be detected.

However, when the light receiving elements comprise CCD elements and in particular when they constitute the common light receiving elements for a distance measuring apparatus using both the passive and active methods, it is difficult to accurately detect the light emitted by the light emitting element simply by determining the difference between the quantities of light received by the CCD elements. Whilst a common integration time control can be applied, this can lead to saturation of the CCD elements making it impossible to detect the spectral center of the light emitted by the light emitting element and reflected from the object. Although light quantity control can be performed, this results in a constant maximum output level in both the case of light being emitted by the light emitting element and reflected from the object and in the case of just ambient light being reflected from the object without emission of light from the light emitting element. As a result, the spectral center of the light emitted by the light emitting element and reflected from the object can not be determined.

SUMMARY OF THE INVENTION

It is therefore an object of the present invention to provide a distance measuring apparatus using the active method with visible light capable of employing general purpose light emitting elements and light receiving elements, even when both the passive and active methods are utilized in the apparatus.

Another object of the present invention is to provide a distance measuring apparatus that uses the active method with visible light and provides highly accurate distance measurement notwithstanding variations in ambient light.

According to the present invention there is provided a distance measuring apparatus for measuring the distance to an object, the apparatus comprising:

a light receiving sensor comprising a plurality of charge couple device (CCD) elements;

a light emitting element for radiating light towards an object; and a system for operating the sensor as an active sensor in combination with the light emitting element for active sensing; wherein the operating system obtains a first data from the sensor while the light emitting element is emitting light, obtains a second data from the sensor while the light emitting element is not emitting light, and detects a spectral center of a received image of the object using operational data evaluated from the obtained first and second data.

The present invention therefore provides a distance measuring apparatus whereby the effects of ambient light can be cancelled out so that only data corresponding to the light emitted by the light emitting element can be determined. The active method is then performed in accordance with this data thereby producing a highly accurate distance measurement even with bright ambient light. In addition, the light emitting element can emit visible light rather than infrared light.

Preferably, the operating system uses predetermined regions of the elements to extract correction data from the first data and the second data, applies the correction data to correct at least one of the first data and second data, and the operational data is evaluated in accordance with a difference between the first data and second data after applying of the correction data.

It is preferred that the predetermined regions are located in a portion of the sensor which does not receive light emitted by the light emitting element and reflected by the object.

In one embodiment, the operating system repeats the obtaining of the first data and the second data and the evaluation of the operational data until the operational data attains a default value.

In another embodiment, the operating system sets a default distance value if the operational data does not attain a predetermined value.

Thus, where the ambient light is too bright and it is difficult to perform effective distance measuring, a default distance value is employed.

Preferably, the default distance value can be substituted by a determined distance value which is evaluated in accordance with a brightness level while the light emitting element is not emitting light.

Therefore, even when a default distance value has to be employed, the default distance value can be changed depending on the brightness level of ambient light. This enables the default distance value to be set closer to an actual distance of the object.

In one case, the default distance value is substituted by the determined distance value when the determined distance value is greater than the default distance value.

In one alternative, the brightness level is determined from the second data.

In another alternative, the brightness level is determined by an external photometer.

Conveniently, the light receiving sensor is operable as a passive sensor for passive sensing.

Examples of the present invention will now be described with reference to the accompanying drawings, in which:

BRIEF DESCRIPTION OF THE DRAWINGS

FIG. 8 is a flowchart showing the operation of the distance measuring apparatus of FIG. 2 using the active method;

FIG. 13 is a flowchart showing the operation of a third embodiment of a distance measuring apparatus of the present invention that can be applied to the camera of FIG. 1, wherein the distance measuring apparatus uses the active method and varies a default value.

DESCRIPTION OF THE PREFERRED EMBODIMENT

Figure 1:
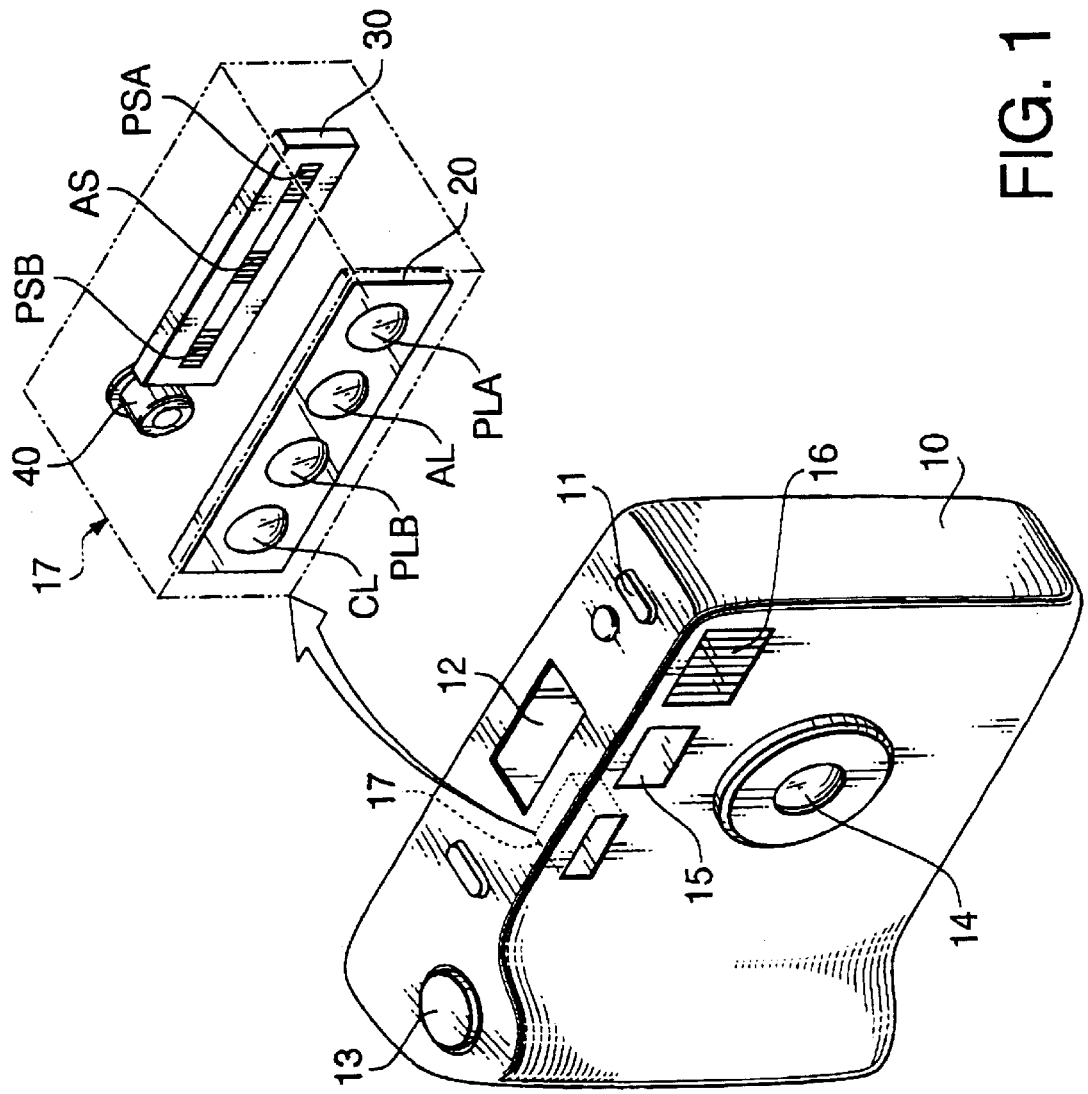
FIG. 1 illustrates a perspective view of a camera, the camera having a distance measuring apparatus of a first embodiment of the present invention applied thereto.

Referring to FIG. 1, a compact camera is provided with a camera body having a multi-function switch 11, an LCD display portion 12, and a release button 13 on the upper surface thereof.

The front of the camera has a photo-taking lens 14 therein. In addition, there is provided a viewfinder window 15, a strobe 16, and a distance measuring apparatus 17 of a first embodiment of the present invention. The distance measuring apparatus is intended to measure the distance of an object to be photographed from the camera.

The distance measuring apparatus, which is provided at the side of the viewfinder window 15, has an optical system comprising a plurality of lenses formed as one compound lens 20, a line sensor 30 on which images of the object are formed, and a light emitting diode (LED) 40 which radiates the object with light.

Figure 2:
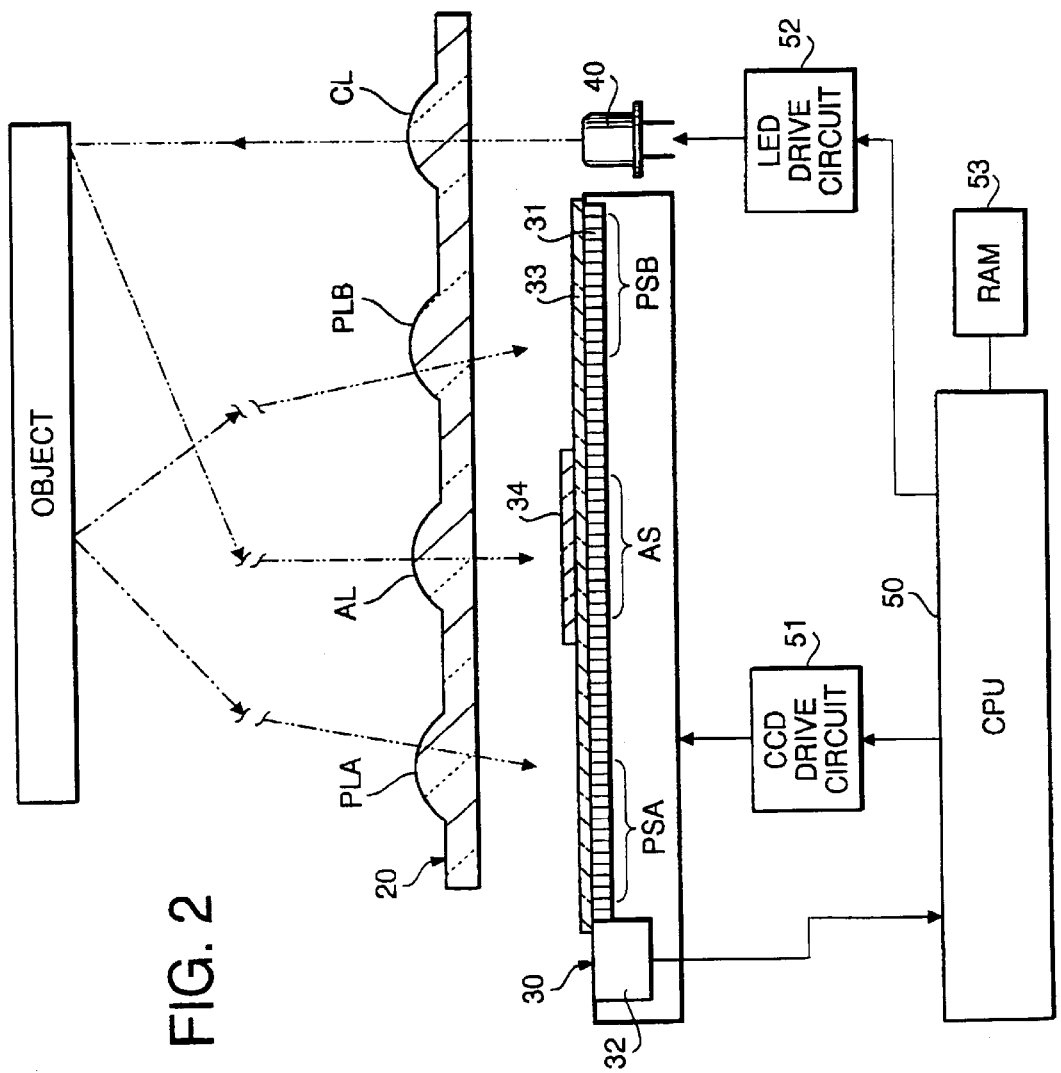
FIG. 2 illustrates a plan view showing the configuration of the first embodiment of the distance measuring apparatus used in the camera of FIG. 1.

Referring to FIG. 2, the line sensor 30 has a light receiving portion 31 comprising a plurality of CCD elements arranged in a straight line. Light incident on the light receiving portion 31 is photo-electrically converted by the elements into an electric charge which is then accumulated therein. This accumulated electric charge is then transferred in a controlled manner along the line to be output as a voltage signal from an output portion 32 provided at one end of the line. Thus, the line sensor 30 can detect the intensity of the light received at the light receiving portion 31.

In the present embodiment, the light receiving portion 31 is divided into three regions which do not overlap one another. The regions at either end of the line are defined as passive sensors PSA and PSB, and with the central region defined as an active sensor AS. An infrared light cut-off filter 33 for cutting out infrared light is provided on the light receiving surface of the line sensor to span across the aforementioned three regions. In addition, a visible light cut-off filter 34 for cutting out visible light is overlaid on the light receiving surface at the region of the active sensor AS.

The LED 40 is selected to emit light of a wavelength within the region of spectral sensitivity of the CCD elements comprising the line sensor 30, and also close to the infrared light region rather than to the visible light.

Figure 3:
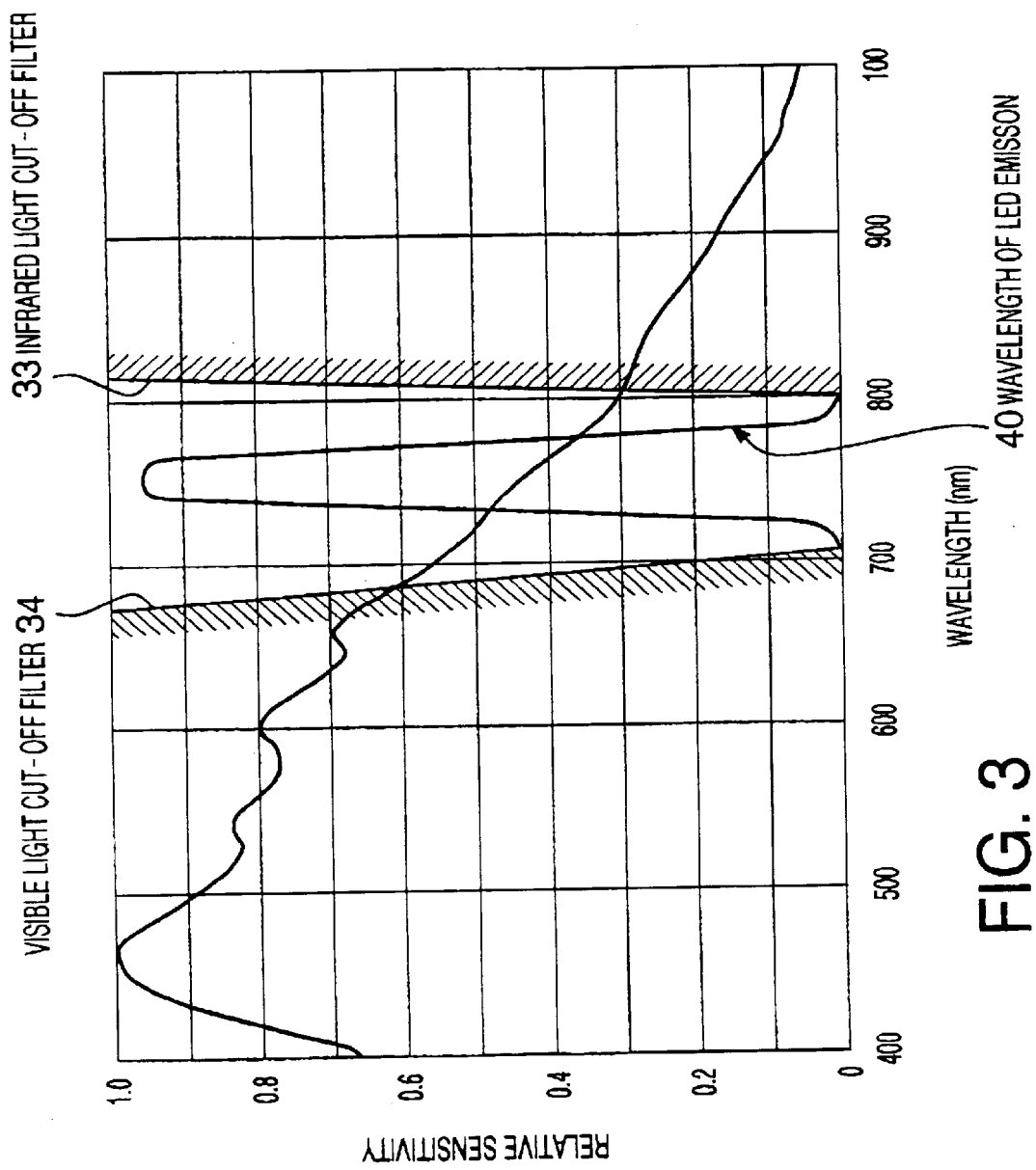
FIG. 3 shows a graph of the spectral sensitivity characteristics of parts of the distance measuring apparatus shown in FIG. 2.

FIG. 3 shows an example of a plot of the spectral sensitivity characteristics of a CCD element together with the cut-off characteristics of the cut-off filters 33 and 34. The LED 40 is therefore selected to emit light of a wavelength longer than the cut-off wavelength of 700 nm of the filter 34 and shorter than the wavelength of 800 nm of the filter 33. For example, the wavelength may be approximately 750 nm.

The compound lens 20 has two passive lenses PLA and PLB which are located to face the passive sensors PSA and PSB, one active lens AL which is located to face the active sensor AS, and a condenser lens CL which is located on the optical axis of the LED 40. Each of the passive and active lenses PLA, PLB, AL, and the condenser lens CL are arranged horizontally at predetermined intervals and formed as one body. The compound lens 20 may be formed as one body from, for example, transparent resin.

The line sensor 30 is connected to a CPU 50 and a CCD drive circuit 51. According to drive signals from the drive circuit, an output signal from the output portion 32 is inputted to the CPU 50. The LED 40 is also connected to the CPU 50 via an LED drive circuit 52. As described below, the CPU 50 selects either the passive or active method as the appropriate operation for distance measurement for the camera. Thus, the CPU 50 actuates the LED 40 to emit light at predetermined intervals in an active method operation while inhibiting the LED 40 to emit light in a passive method operation except in special cases.

In each operation, the output from the line sensor 30 is captured and a calculation of the distance to an object is performed. The CPU 50 is also connected with a RAM 53 for storing various kinds of data required for distance measurement calculation.

The distance measurement by the above described apparatus will now be explained below.

Figure 4:
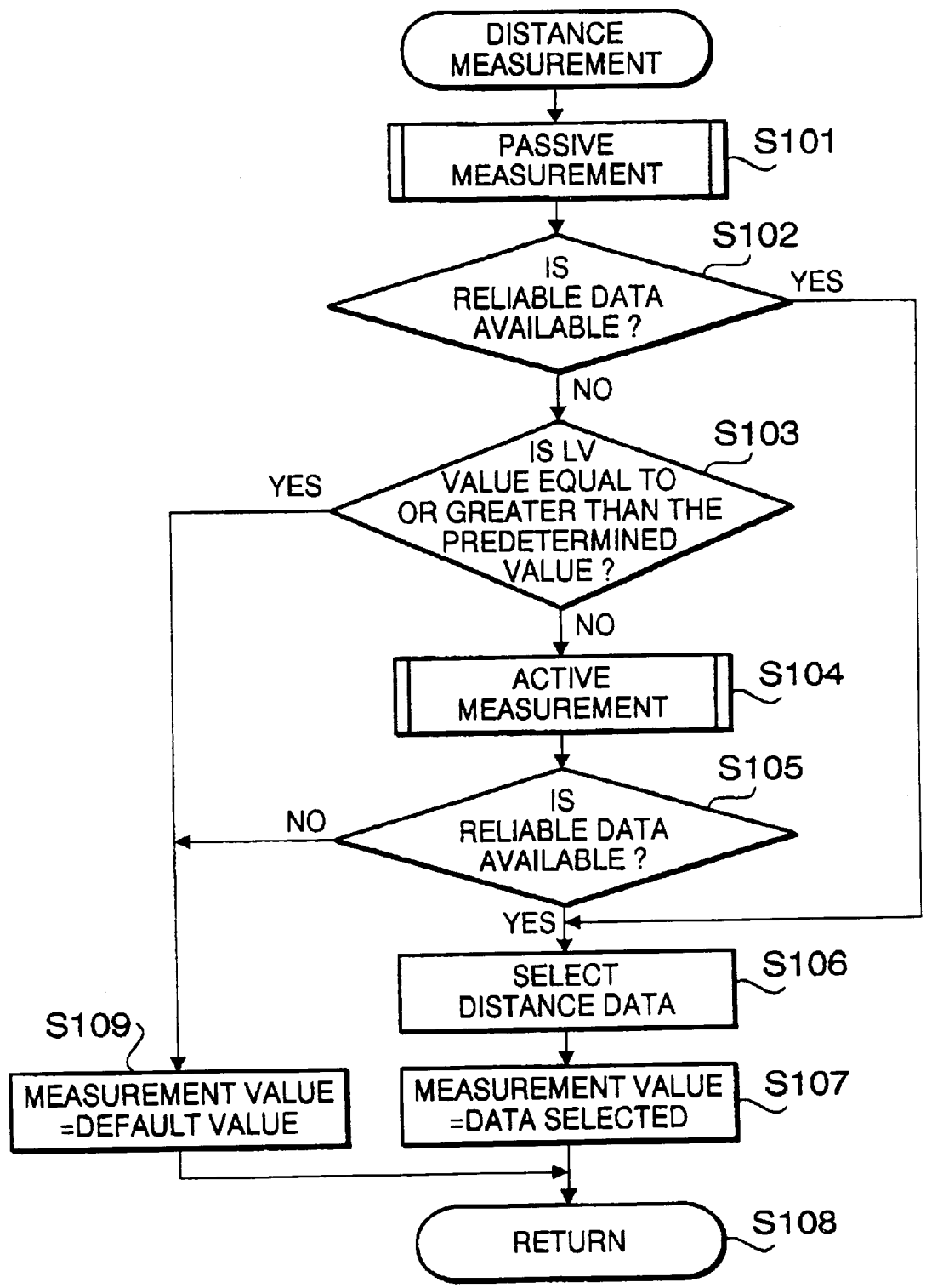
FIG. 4 is a flowchart showing the operation of the distance measuring apparatus shown in FIG. 2.

FIG. 4 is a flowchart that shows a distance measurement operation. First, a distance measurement command is input to the CPU 50 from the camera side which causes the CPU 50 to execute the passive method operation (S101). In this passive method operation, the CPU 50 outputs an integration start command to the CCD drive circuit 51.

As a consequence, the line sensor 30 starts integration and then ends the integration on receipt of an accumulation end command from the drive circuit 51. Subsequently, the electric charge accumulated in the light-receiving portion 31 is transferred to the output portion 32 in synchronization with a clock signal and outputted therefrom as data in the form of A/D converted current or voltage. The data is stored in the RAM 53 and the CPU 50 subsequently calculates therefrom the distance to the object.

Figure 5:
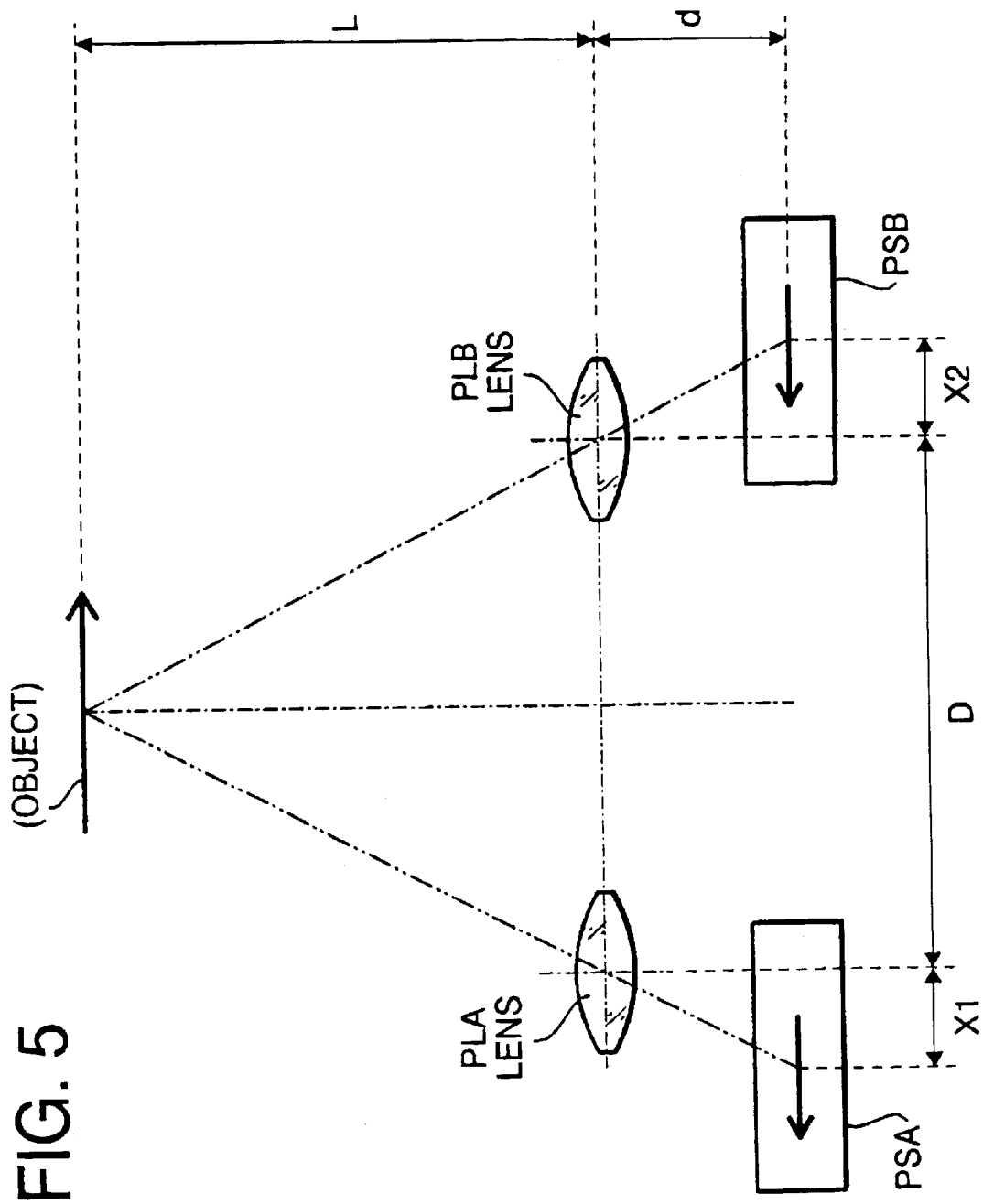
FIG. 5 is a schematic diagram explaining distance measurement for the distance measuring apparatus of FIG. 2 operating using a passive method.

The operation of the distance measurement is the same as the conventional passive method, but will be briefly explained below. Referring to FIG. 5 a respective image of the object targeted for distance measurement is formed by the two passive lens PLA and PLB on the passive sensors PSA and PSB at both sides of the line sensor 30.

With the arrangement illustrated, the distance between the optical axes of the two passive lenses PLA and PLB is D, and the distance from both passive lenses PLA and PLB to each passive sensor PSA and PSB is d. The distances of the optical axis of each passive lens PLA and PLB from a particular point of each object image formed on each passive sensor PSA and PSB, for example, the horizontal center point, are x1 and x2 respectively while the distance from the object to the camera is L.

Then, according to trigonometry the following equation can be derived:

$$(L+d)/L=(D+x1+x2)/D \tag{1}$$

From this, the following equation can be derived:

$$L=(D \cdot d)/(x1+x2) \tag{2}$$

Figure 6A:
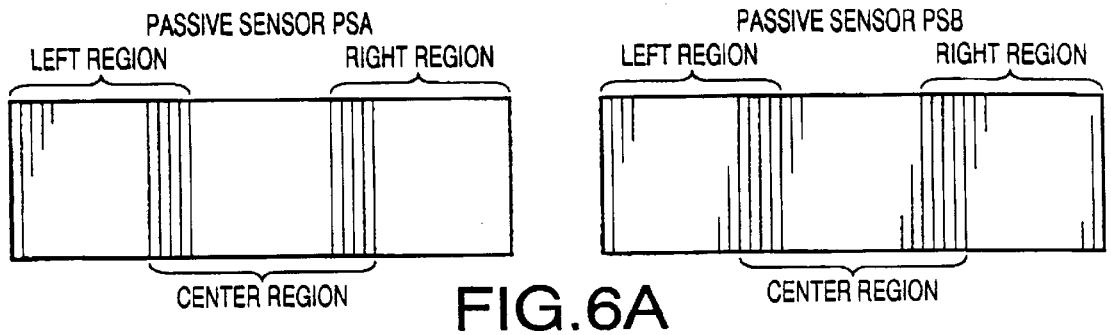
FIGS. 6A to 6C illustrate a method for detecting the image position of the spectral center in the passive method.

The passive method requires the detection of the parallax resulting from a difference in the position, on the passive sensors PSA and PSB, of the image from the same object. As shown in FIG. 6A, in this embodiment, each passive sensor PSA and PSB is divided, in the longitudinal direction of the line sensor 30, into three regions defined as the right region, center region, and left region, with their boundaries slightly overlapping.

Figure 6B:
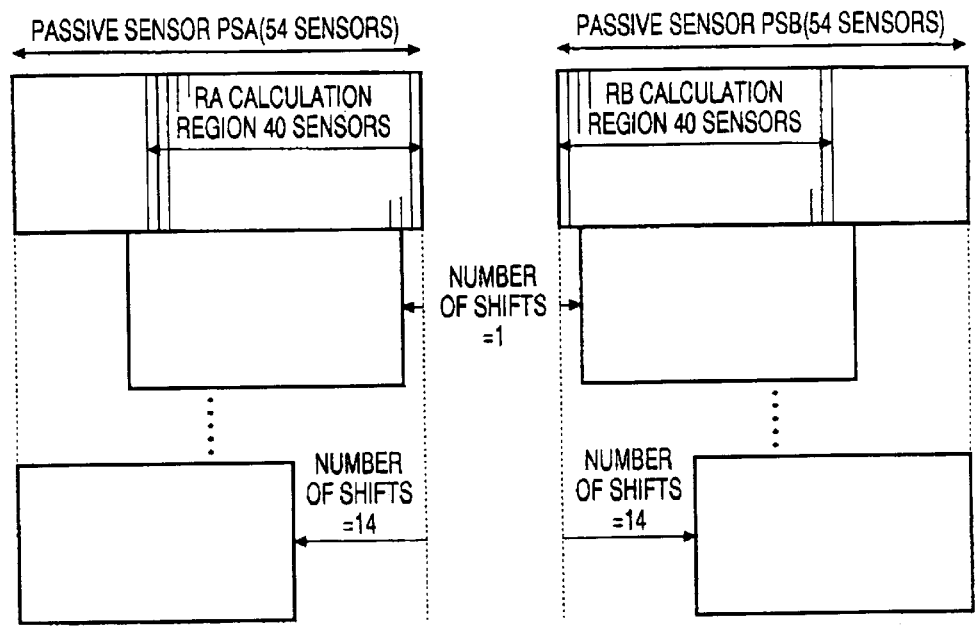

As shown in FIG. 6B, in the present embodiment, the right region, center region, and left region of each passive sensor PSA and PSB comprise fifty four (54) elements respectively. For each region, a group of CCD elements in number equal to or greater than half the total number of elements in that region are selected as a calculation region RA and RB corresponding to sensors PSA and PSB respectively. In this embodiment, forty (40) elements are used for the calculation regions RA and RB. The calculation regions RA and RB are arranged at line symmetrical positions in the regions across both passive sensors PSA and PSB. Then, differences in the output for each element between both passive sensors are determined by shifting the elements of each calculation region one by one alternately between each passive sensor. The differences in output are also added over the calculation regions RA and RB. Consequently, in the present case, only fourteen (14) elements are shifted at each calculation region RA and RB, thereby providing twenty nine (29) pieces of data including differences in output with non-shifted states added.

It will be appreciated that the number of elements in each region and in each calculation region can be varied.

Figure 6C:
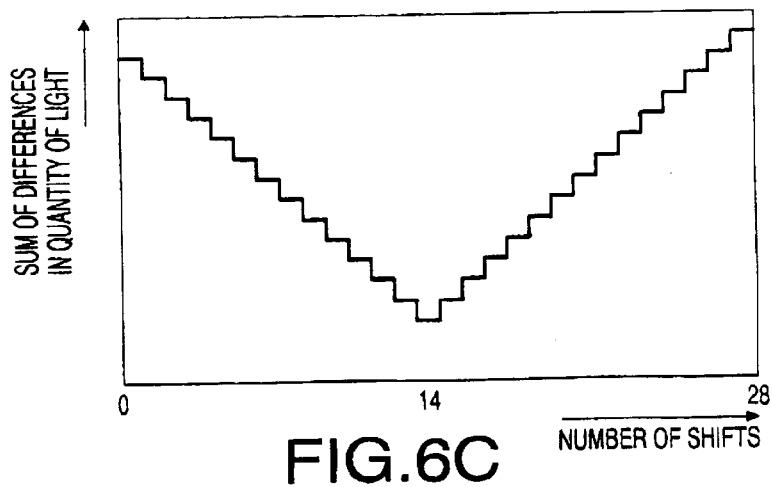

FIG. 6C show that the data results in a minimum value at a certain shift position, whereby the parallax (phase difference) can be determined. Therefore, the values of x1 and x2 in equations (1) and (2) can be obtained as a phase difference (x1+x2) so that the object distance L can be calculated.

The aforementioned calculation is performed for each of the three regions of each passive sensor.

Now, referring again to FIG. 4, the reliability of the data in the distance measuring calculation with the passive method, as described above, is judged in step S102. When it is determined that reliable data exists, the most reliable data is selected (S106) as distance measuring data to obtain a distance value (S107), and then the distance measurement is finished (S108). In the judgement of reliability, for example, the calculation can be performed for each of the divided three regions of each passive sensor PSA and PSB, respectively, with a plurality of calculations being performed for each region.

An average value and a variation for each distance measurement data are calculated from the plurality of distance measurement data thus obtained. Data which has an average value and variation value within a predetermined range of error is considered as reliable data. Then, one of the most reliable data is selected from the reliable data, and a distance measurement is calculated from that selected data.

If it is judged that no reliable data can be obtained in step S102, the CPU 50 executes the active method operation (S104).

Before performing the active method operation, it is determined whether the brightness of ambient light (Lv value) measured by a photometer (not shown) is equal to or greater than a certain level (S103).

With a value of Lv equal to or greater than a certain level, while the light emitted from the LED 40 will be reflected from an object with the active method, it will be difficult for the line sensor 30 receiving the reflected light to distinguish clearly the reflected light from the ambient light. This will cause the accuracy of the distance measurement to decrease so that reliable data can not be obtained. In this case, when the Lv value is equal to or greater than a certain level, the distance measurement value is set to a predetermined default value (S109). The default value is normally set to 2 to 3 m. This is based on the fact that pictures are often taken with an object being spaced 2 to 3 meters from a camera. Therefore, when the distance measuring data can not be considered as reliable, the default value is adopted which increases the probability of photo taking being in focus to a certain extent together with a suitable depth of field.

When the value Lv is below the certain level mentioned above, the active method mode is actuated (S104).

The operation of the distance measurement for the active method will be explained below with reference to FIG. 7A. The LED 40 emits a light towards an object. This light is reflected from the object in a diffuse manner and an image is formed on the active sensor AS by system of the active lens AL. The optical axis of the diffusely reflected light from the object can be prior detected to establish a center for the optical axis, and then the active sensor AS can detect the spectral center of the image of the object. In the present case, the spectral center is detected as the position of the CCD element having the highest light intensity value among the plurality of CCD elements constituting the active sensor AS.

If the distance from the object to the camera is L, the distance from the LED 40 to the optical axis of the active lens AL is D1, the distance between the active lens AL and the active sensor AS is d, and the distance from the spectral center of the detected object image to the active lens optical axis is x3, then, the following equation is derived:

$$(L+d)/L = (D1+x3)/D1 \quad (3)$$

From this, the following equation can be derived:

$$L = (D1 \cdot d)/x3 \quad (4)$$

As mentioned above, when the ambient light is very bright, it can often be difficult to distinguish between the light emitted from the LED 40 and reflected from the object and the ambient light reflected from the object.

In the first embodiment of the present invention, a method is used whereby one set of data is obtained by detecting the light reflected from the object in the case that the LED 40 does not emit light, and another set of data is obtained by detecting the light reflected from the object in the case that the LED 40 does emit light. By subtracting the two sets of data, the light provided only by the LED 40 and reflected by the object can be extracted. As a result, the value of Lv in step S103 can be increased. Although this embodiment will be described with LED 40 emitting infrared light, it should be noted that an LED emitting visible light may instead be employed.

The operation of detecting the spectral center in this way for the active method will now be explained referring to the flowchart in FIG. 8 and the signal level diagrams in FIG. 9.

Firstly, the CPU 50 outputs a signal to the LED drive circuit 52 to actuate the LED 40 to emit light so that the object is irradiated with the emitted light through the condenser lens CL (S201). Additionally, in synchronization with this, the CPU 50 outputs an integration start-up command to the CCD drive circuit 51 (S202).

As a consequence, the active sensor AS starts integration of the received light, which comprises a mixture of light emitted by the LED 40 and reflected by the object as well as ambient light reflected from the object. The integration is ended on receipt of an accumulation end command from the drive circuit 51 (S203). Subsequently, the electric charge accumulated in the light receiving portion 31 is transferred to the output portion 32 in synchronization with a clock signal and outputted therefrom as data in the form of A/D converted current or voltage. This data is then stored in RAM 53 (S204) as DATA1, shown in the left of FIG. 9A, and the LED drive circuit 52 turns off the LED 40 (S205).

Then, in steps S206 to S208, the processes of steps S202 to S204 are repeated, but it will be noted that light is not emitted by LED 40 so that the active sensor AS only receives ambient light reflected by the object. The data outputted from output portion 32 is this time stored in RAM 53 as DATA2, shown in the right of FIG. 9A.

Subsequently, the CPU 50 starts an operation to assess the signal level of a plurality of CCD elements in a non-usable area NA of the active sensor AS. As shown in FIG. 7B, the active sensor AS is defined in this case to have a number of CCD elements in the center region as a usable area UA for distance measurement, with the CCD elements in the regions on either side thereof as non-usable areas NA which do not receive the light emitted by the LED 40 and reflected by the object.

Figure 9A:
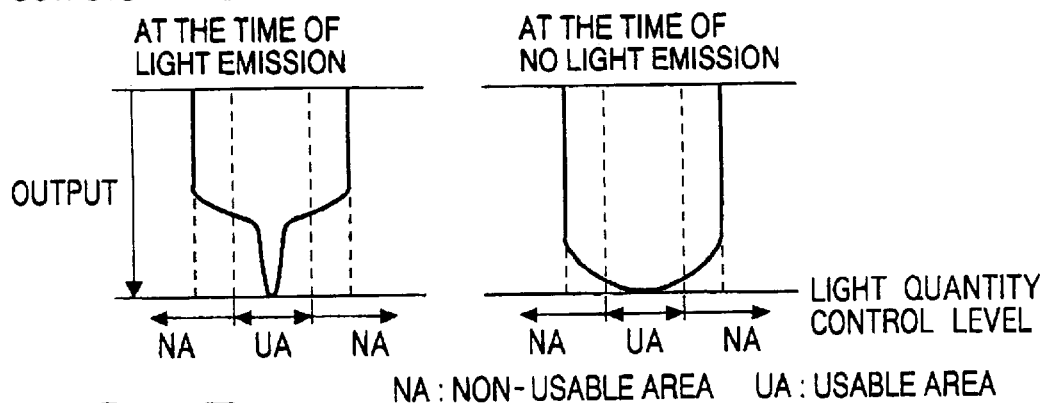
FIGS. 9A to 9D show signal levels of data obtained during the operation shown in FIG. 8.
Figure 9B:
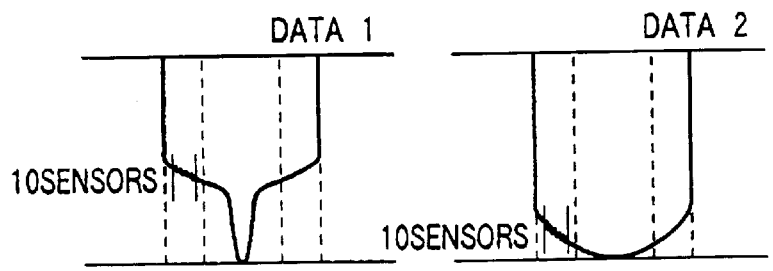

In the present case, as shown in the left of FIG. 9B, the CPU 50 firstly checks the signal level of each of ten CCD elements in the non-usable area of the data of DATA1 in order to determine an average level LA1. Then, as shown in the right of FIG. 9B, the CPU 50 checks the signal level of each of ten corresponding CCD elements in the non-usable area of the data of DATA2 in order to determine an average level LA2. It will be appreciated that a different number of CCD elements can be checked. (S209).

Figure 9C:
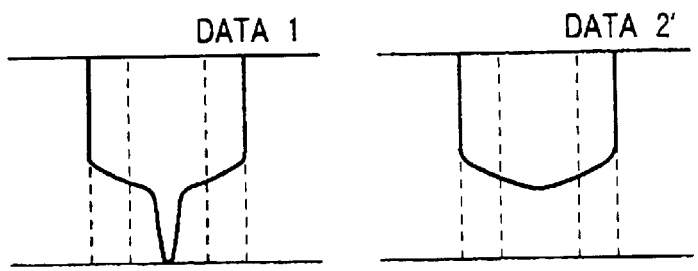

Thereafter, the ratio of the average levels LA1 to LA2 is determined and the stored data is corrected by multiplying one of them by the ratio. In the present case, the data of DATA2 is corrected (S210). For example, when a ratio of the levels LA1 and LA2 is ½, the data of DATA2 is multiplied by ½ which leads to a corrected data, DATA2', as shown in the right of FIG. 9C. In this way, the two sets of data, as shown in FIG. 9 are equalized or normalized.

Figure 9D:
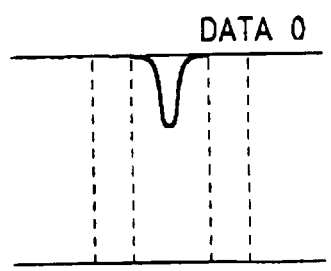

Thereafter, the difference between these two data is determined (S211) so that the data, DATA0, corresponding to just the light emitted by the LED 40 and reflected by the object is determined, as shown in FIG. 9D.

Then, by detecting the CCD element which provides the peak for the data of DATA0, the spectral center of the image of the object can be detected. From this, the distance of the object can be determined by evaluating the value of x3 in equations (3) and (4) (S213, S214).

Prior to step S213, the peak value of the data of DATA0 is compared with a default value (S212). When the peak value is less than the default value, steps S201 to S211 are repeated with the resultant signal levels of the evaluated data of DATA0 being added together.

The method described above therefore strips out the effects of ambient light during operation of the active method and thus enables an increase in the accuracy of distance measurement.

When the active method operation (S104) is performed, it is preferable for the LED to emit light repeatedly to produce distance measuring data at each emission of light so that a plurality of distance measuring data are provided.

As shown in FIG. 4, it is determined whether reliable distance measuring data has been obtained from the plurality of data, for example, in a similar manner to that for the passive method operation (S105). When it is determined that reliable data exists, distance measuring data is selected (S106) and the selected data is used as a distance value (S107).

If no reliable distance measuring data is obtained, for example, in the case where the output of the LED 40 is too small or the object is located too far away to identify accurately the position of the spectral center of the image, the aforementioned default value is used as a distance value (S109).

Figure 10:
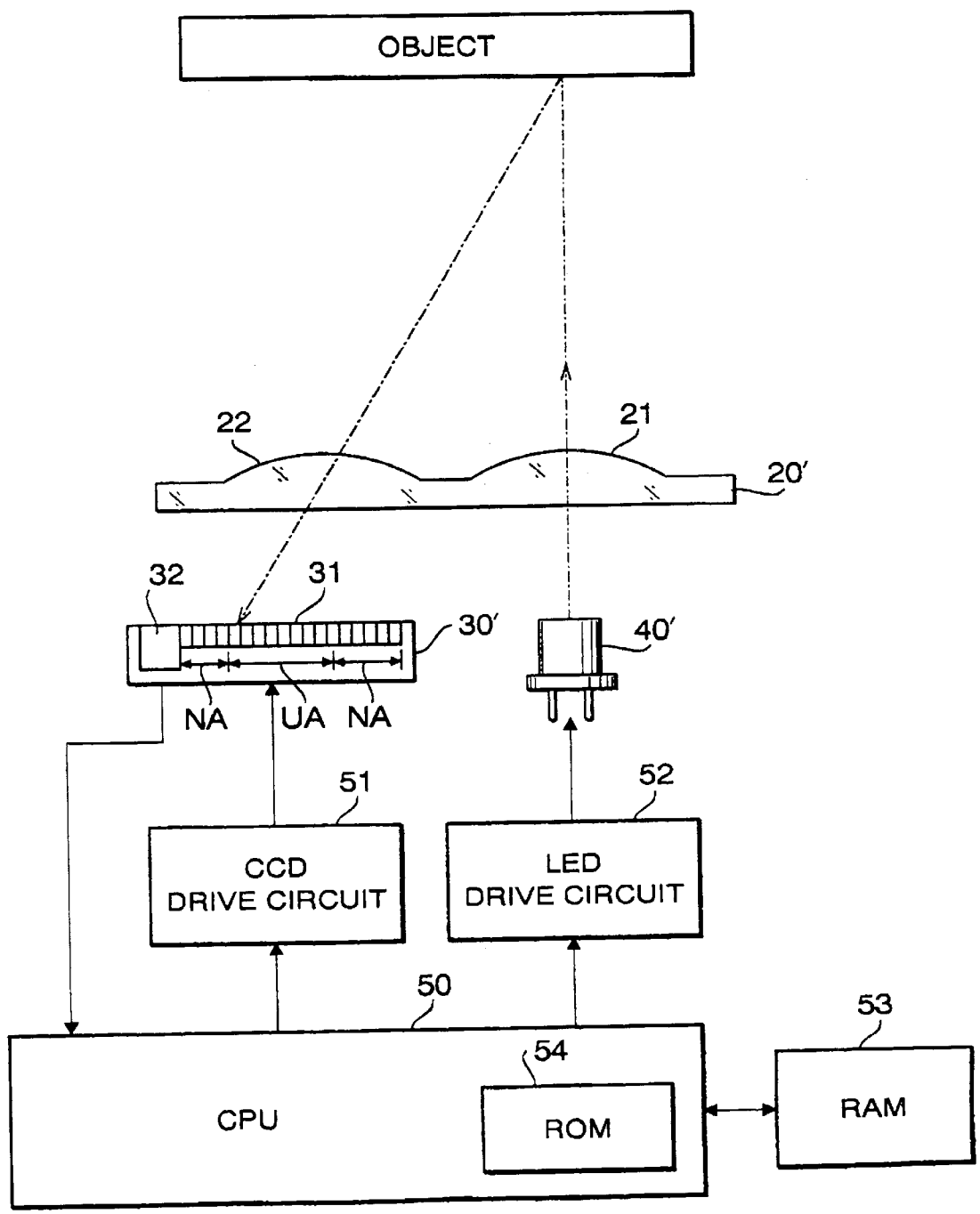
FIG. 10 illustrates a plan view showing the configuration of a second embodiment of a distance measuring apparatus of the present invention that can be applied to the camera of FIG. 1.

FIG. 10 illustrates a plan view showing the configuration of a second embodiment of a distance measuring apparatus 17' of the present invention that can be applied to the camera of FIG. 1. Components which are common to the first embodiment bear common references.

The distance measuring apparatus 17', which is provided at the side of the viewfinder window 15 of the camera of FIG. 1, has a compound lens 20', a line sensor 30' on which images of the object are formed, and a light emitting diode (LED) 40' that is capable of emitting light of one of the wavelengths within a visible light region to irradiate the object with light. The line sensor 30' has a light receiving portion 31 comprising a plurality of CCD elements arranged in a straight line. The manner of electric charge accumulation and transfer to the output portion 32 is the same as that described with reference to FIG. 2 and will not be repeated here. A number of the CCD elements in the centre region of the line sensor 30' are defined as a usable area UA for distance measurement, with the CCD elements in the regions on either side thereof as non-usable areas NA which do not receive the light emitted by the LED 40 and reflected by the object.

The compound lens 20' comprises a condenser lens 21 which is located on the optical axis of the LED 40' so as to condense the light emitted by the LED 40' toward an object in front of the camera, and a converging lens 22 for converging the light reflected by the object to form images on the line sensor 30'. The compound lens 20' may be formed as one body from, for example, transparent resin.

Figure 7A:
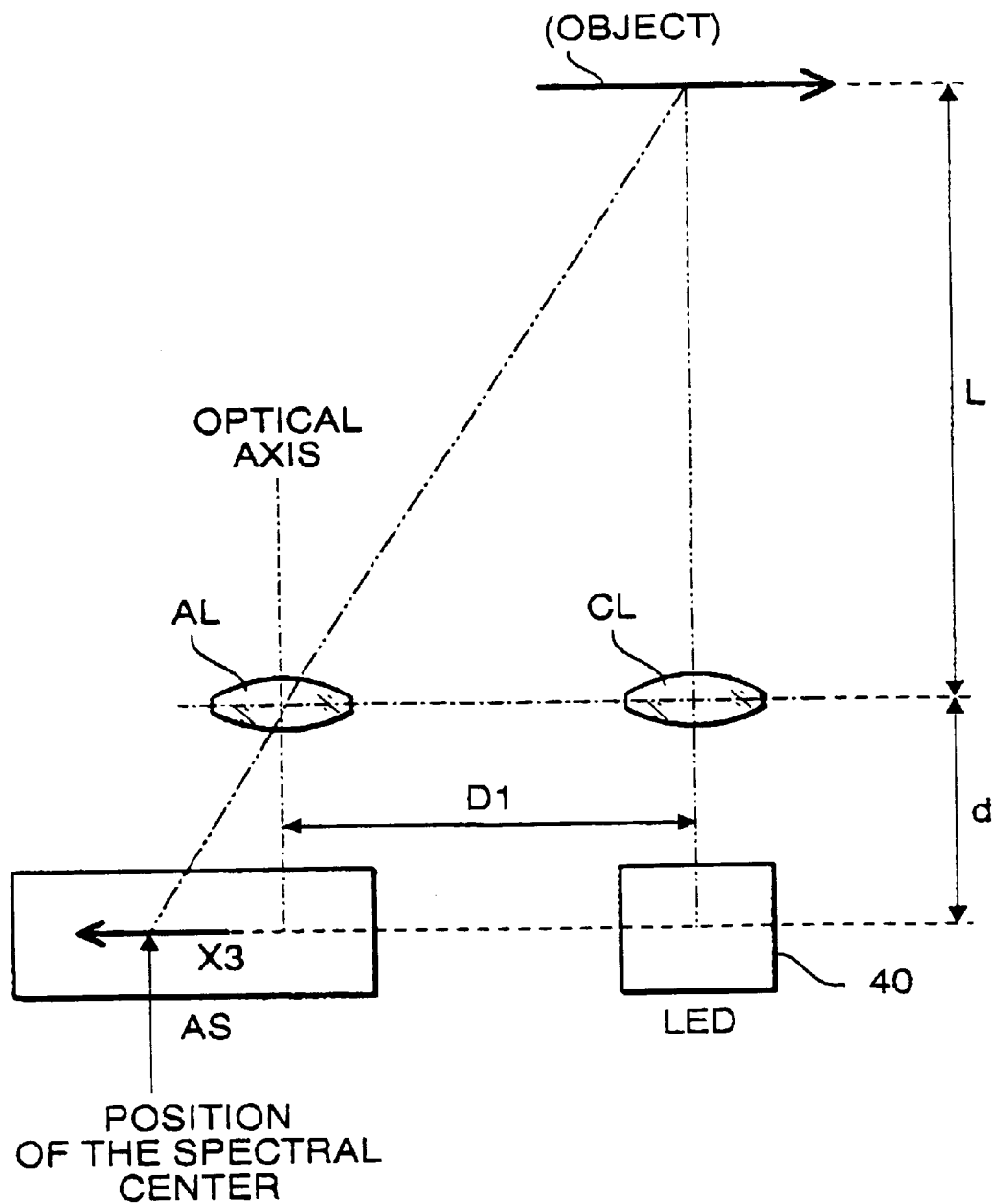
FIG. 7A is a schematic diagram explaining distance measurement for the distance measuring apparatus of FIG. 2 operating using an active method.
Figure 7B:
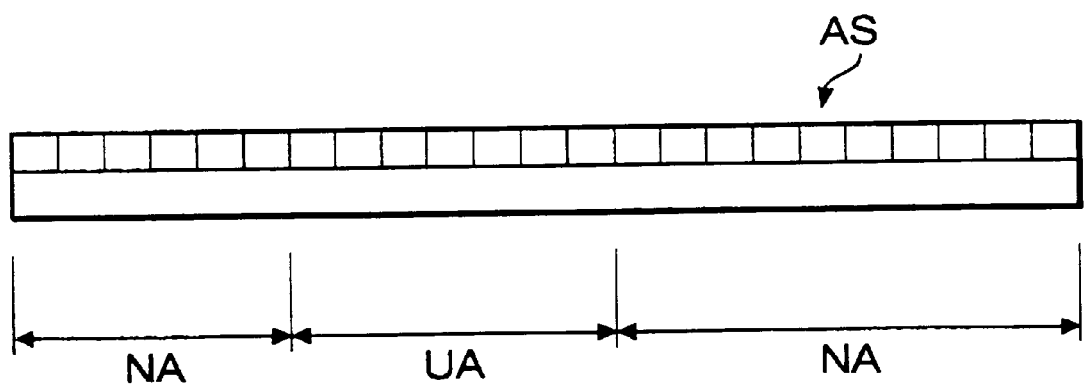
FIG. 7B shows an arrangement of CCD elements when the active method shown in FIG. 7A is used.
Figure 11:
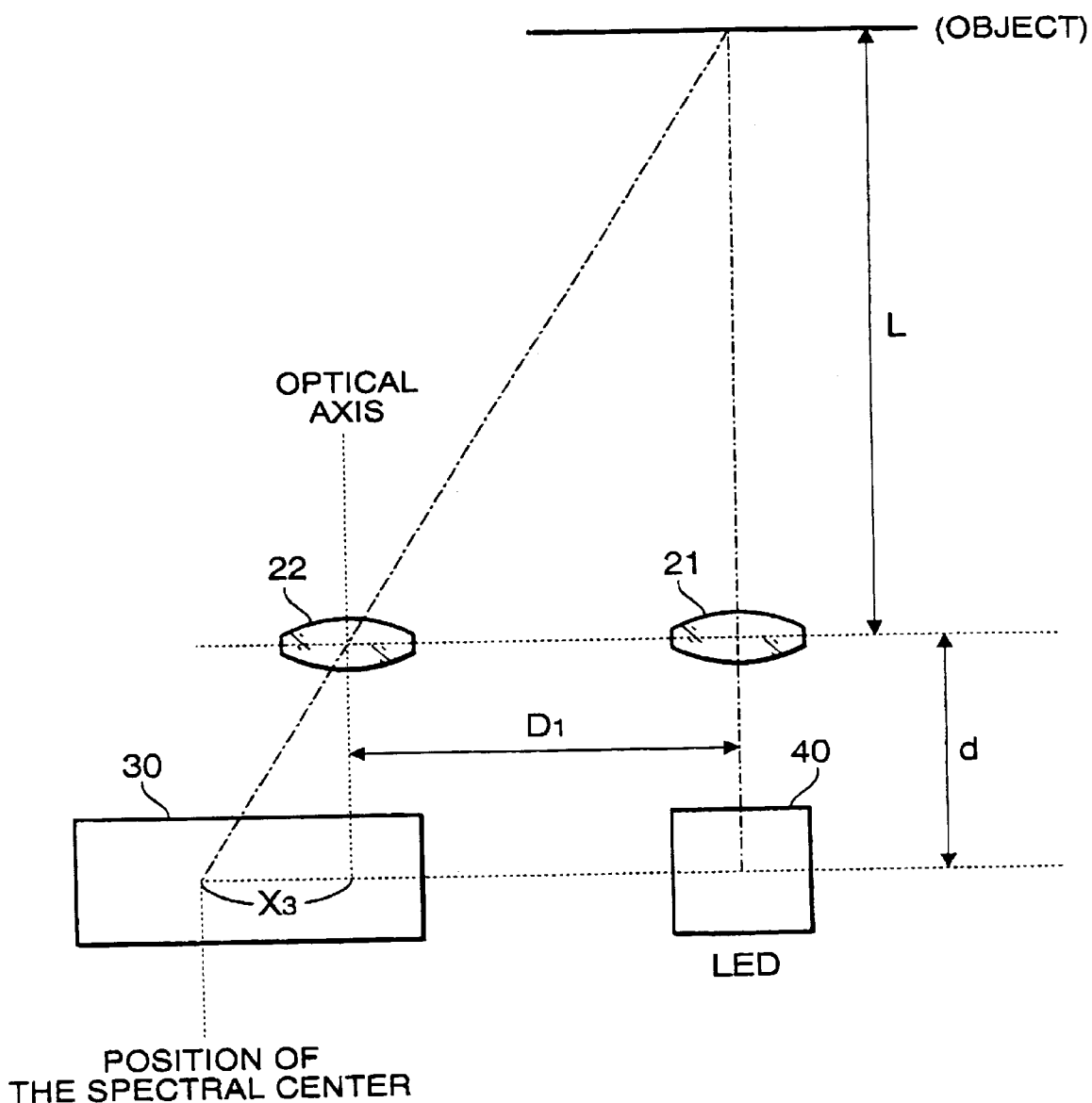
FIG. 11 is a schematic diagram explaining distance measurement for the distance measuring apparatus of FIG. 10 operating using an active method.

The operation of the distance measurement for the active method for the second embodiment is shown in FIG. 11 and corresponds with the operation and description thereof in relation to FIG. 7A except that condenser lens 21 corresponds to the condenser lens CL of FIG. 7A and the converging lens 22 corresponds to the active lens AL of FIG. 7A. In particular, the equations 3) and 4) and the derivation thereof remain the same and the operation and detection of the signal levels is the same as described in relation to FIGS. 8 and 9. Accordingly, a description of these features will not be repeated here and the reader is referred to the description herein above.

As mentioned above, when the brightness of the ambient light (Lv value) is equal to or greater than a certain level, it is difficult to obtain the data of DATA0 and this causes the accuracy of the distance measurement with the active method to decrease since reliable distance measurements are not provided.

Figure 12:
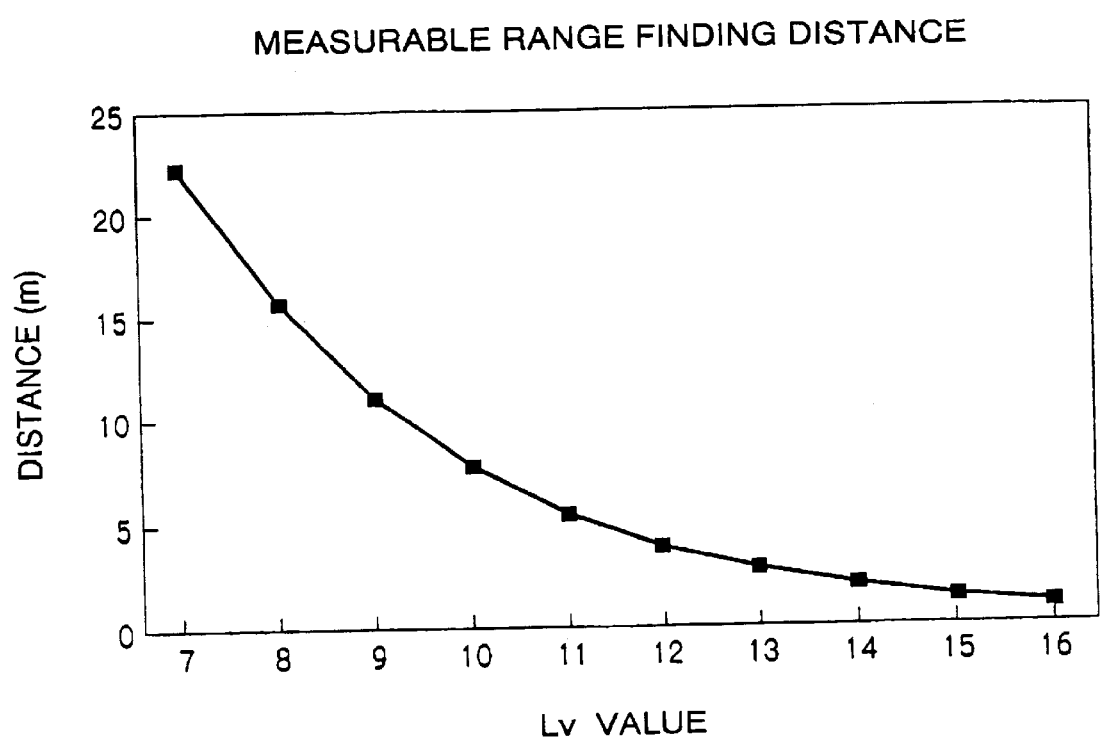
FIG. 12 shows a graph of measurable distance values against values of Lv.

Referring to FIG. 12, the y-axis shows distance values in meters at which measurable distance data can be obtained against Lv values of brightness on the x-axis. From this it will be noted that the measurable distance value, and hence a reliable measurement, becomes shorter with an increase in the Lv value.

However, while it is true that the measurable distance value becomes shorter with an increase in the Lv value, conversely the measurable and hence reliable distance value becomes greater with a decrease in the Lv value.

Consequently, the aim of providing a highly accurate distance measurement value is not met if an across the board default value is set when the Lv value is above a constant threshold Lv value.

A third embodiment of the present invention therefore aims to vary the default value in accordance with variations in Lv values.

Figure 14A:
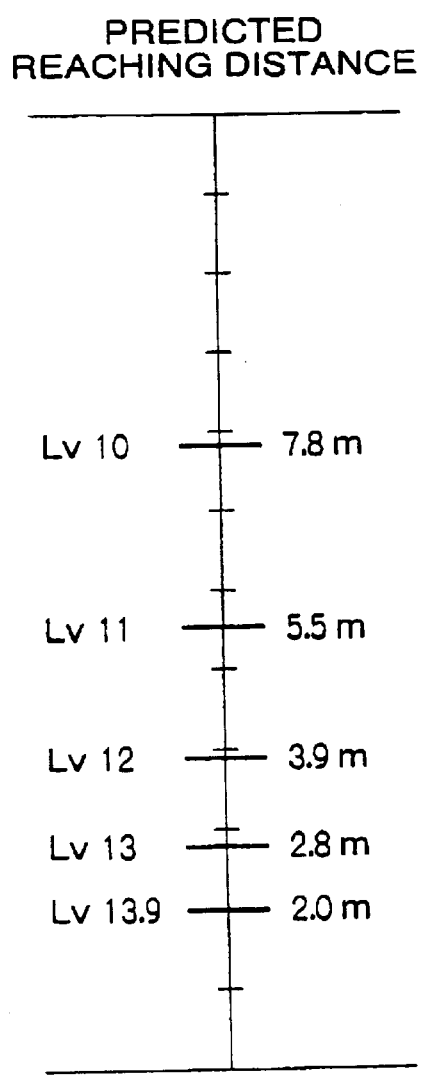
FIGS. 14A and 14B show the relationship between the measurable distance values and corresponding default distance values in the case of ambient light brightness levels being equal to a specific Lv value.

Referring to FIG. 14A, this shows the relationship between the measurable distance values in the case of ambient light brightness levels being equal to a specific Lv value. That is to say, predicted distance values are shown which correspond to the furthest distance that the light from the LED 40 is expected to reach and still be reflected from an object and be detected when the ambient brightness level is equal to a specified Lv value.

FIG. 13 is a flowchart showing the operation of the third embodiment of a distance measuring apparatus which uses the active method and varies a default value. In this flowchart, steps common to FIG. 8 bear common reference numerals and common operations. Accordingly, a description of their functions will not be repeated.

In the third embodiment, after step S208, the Lv value of the ambient light is detected (S221). This can be either evaluated on the basis of the data of DATA2 and the integration time for the data or by system of an external photometer (not shown). The detected Lv value is then checked with the characteristics shown in FIG. 12 to establish a measurable distance value (S222). Thereafter, the measurable distance value is compared with a first predetermined default distance value (S223). As shown in FIG. 14A, this is equal to 2.0 m in this embodiment.

If at step S223, it is found that the measurable distance value calculated at step S222 is not greater than the first predetermined default distance (2.0 m), that is to say it is less than the first default distance value, the procedure proceeds to step S209 to S211 as with the first and second embodiments. Then, unlike the first and second embodiments which compare the peak value of the data of DATA0 with a predetermined value (S212) and when the peak value is less than the predetermined value, steps S201 to S211 are repeated with the resultant signal levels of the evaluated data of DATA0 being added together, in the third embodiment, when the peak value of the data of DATA0 is less than the predetermined value, the distance to the object is immediately set to the current default distance (S215), in this case 2.0 m.

Figure 14B:
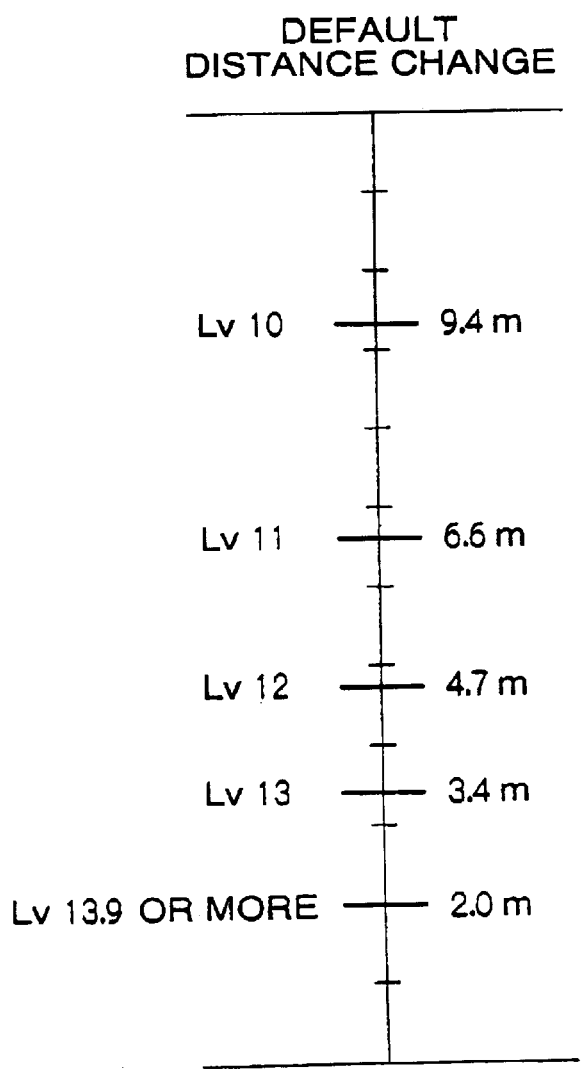

If at step S223, it is found that the measurable distance value calculated at step S222 is greater than the first predetermined default value (2.0 m), the calculated measurable distance value corresponding to the value Lv, as shown in FIG. 14A, is multiplied by 1.2 as shown in FIG. 14B, and this value is made the default distance value. For example, if the Lv value detected at step S221 is equal to Lv12, then the measurable distance value is calculated at step S210 to be 3.9 m as can be seen in FIG. 14A. As a result, the judgement at step S223 is "Yes", and thus the default distance value, currently the first distance value of 2.0 m, is changed to a default distance value of 4.7 m corresponding to Lv12 shown in FIG. 14B at step S224. Consequently, at step S212, when the peak value of the data of DATA0 is less than the predetermined value, the distance to the object is set to the current default distance (S215), which is now 4.7 m.

It should be noted that when the Lv value is equal to or greater than 13.9, the measurable distance value is set to be equal to or less than 2 m as shown in FIG. 14A. In this case, the default distance is not changed in step S224 and it remains as the first default distance value.

Thus, the reliability of the distance measuring data is calculated in accordance with the obtained data and if it is determined to be too low to perform distance measuring, the default distance value which may or may not have been changed at step S224 is set as the distance data and then the procedure is ended.

This system that, when the data of the reflected light from the object is not equal to or greater than a certain predetermined value, the object is determined to be located further than the measurable distance value, and thus the default value is processed in order to bring the default distance as close as possible to the object. When the data of the reflected light from the object is equal to or greater than a certain predetermined value, distance data is calculated and determined in accordance with the operation data at step S213 and step S214.

With the first embodiment, distance measuring using the passive and active methods can take place individually. Furthermore, the passive method is used with a higher priority to obtain distance data, while the active method is used to obtain distance data in the case where the brightness of the ambient light is lower than a predetermined level, when reliable distance data is not available with the passive method. This provides an increase in the probability of reliable distance data under various photo taking conditions.

In addition, highly accurate distance measuring can be obtained even with bright ambient light. Moreover, even with CCD elements employed as the light receiving sensors for the active method, the light emitted by a light emitting element and reflected by an object can be extracted. In particular, the active method an be employed using visible light without employing infrared light, and thus it is not necessary to use expensive parts as light emitting and light receiving elements for infrared light use. In addition, because a line sensor employing CCD elements is used as the light receiving sensor for the passive method and active method, both PSD and CCD sensors are not required. Thus, it is possible to simplify the configuration of the apparatus and miniaturize and decreasing the weight of the apparatus.

It will be appreciated that the distance measuring apparatus of the present invention may be applied to cameras employing silver film, as well as to various kinds of cameras such as digital cameras and video cameras. The combination of the distance measuring apparatus of the present invention with AF devices enables highly accurate AF photo taking.

With the third embodiment, unlike the disadvantages of the previous distance measuring apparatus using the active method, a highly accurate distance measurement is possible even with bright ambient light. Moreover, even when a default distance must be employed due to brightness of the ambient light, it becomes possible to set a default distance closer to an actual distance of the object. Furthermore, without using infrared light, active range finding can be realized with visible light, whereby expensive parts for infrared light are not required as light emitting and light receiving elements so that it is possible to construct the apparatus more cheaply with general-purpose parts.

As explained in the foregoing, the present invention uses first data obtained when a light emitting element emits light and second data obtained when the light emitting element emits no light so that ambient light is cancelled out whereby only data for the light emitted by the light emitting element remains. The active method then is carried out in accordance with this data so that highly accurate distance measurement can be realized even with bright outer light. Furthermore, when the distance measuring apparatus is constructed integral with a passive range finder, CCD elements can be commonly used as the light receiving sensors enabling miniaturization of the apparatus with additional reductions in price.

The present disclosure relates to subject matters contained in Japanese Patent Application No. HEI 10-293428 filed on Oct. 15, 1998, Japanese Patent Application No. HEI 10-293429 filed on Oct. 15, 1998, and Japanese Patent Application No. HEI 11-163367 filed on Jun. 10, 1999, which are expressly incorporated herein by reference in their entity.

What is claimed is:

1. A distance measuring apparatus for measuring the distance to an object, the apparatus comprising:

a light receiving sensor comprising a plurality of charge couple device (CCD) elements;

a light emitting element for radiating light towards an object; and a system for operating said sensor as an active sensor in combination with the light emitting element for active sensing;

wherein the operating system obtains a first data from the sensor while the light emitting element is emitting light, obtains a second data from the sensor while the light emitting element is not emitting light, and detects a spectral center of a received image of the object using operational data evaluated from the obtained first and second data, and wherein said operating system uses predetermined regions of said elements to extract correction data from said first data and said second data, applies said correction data to correct at least one of said first data and second data, and said operational data is evaluated in accordance with a difference between the first data and second data after application of said correction data.

2. Apparatus according to claim 1 wherein said predetermined regions are located in a portion of said sensor which does not receive light emitted by said light emitting element and reflected by said object.

3. Apparatus according to claim 1 wherein said operating system repeats the obtaining of said first data and said second data and the evaluation of said operational data until said operational data attains a predetermined value.

4. Apparatus according to claim 1 wherein said operating system sets a default distance value if said operational data does not attain a predetermined value.

5. Apparatus according to claim 4 wherein said default distance value can be substituted by a determined distance value which is evaluated in accordance with a brightness level while the light emitting element is not emitting light.

6. Apparatus according to claim 5 wherein said default distance value is substituted by the determined distance value when the determined distance value is greater than the default distance value.

7. Apparatus according to claim 5 wherein said brightness level is determined from said second data.

8. Apparatus according to claim 5 wherein said brightness level is determined by an external photometer.

9. Apparatus according to claim 1 wherein said light receiving sensor is operable as a passive sensor for passive sensing.

* * * * *